United States Patent
Wass

[11] Patent Number: 6,036,169
[45] Date of Patent: Mar. 14, 2000

[54] SELF ALIGNABLE THREADED CAP AND THREADED PRESSURE RELIEF VALVE

[76] Inventor: Lloyd G. Wass, 1670 Blackhawk Cove, Eagan, Minn. 55122

[21] Appl. No.: 09/079,765

[22] Filed: May 15, 1998

[51] Int. Cl.[7] .................................................. F16K 31/44
[52] U.S. Cl. .............................. 251/82; 251/89; 138/89.3; 441/40
[58] Field of Search ....................... 251/82, 89; 138/89.3; 441/40; 137/230, 232

[56] References Cited

U.S. PATENT DOCUMENTS

| | | | |
|---|---|---|---|
| 1,263,599 | 4/1918 | Poole | 137/232 |
| 1,329,146 | 1/1920 | Slater | 138/89.3 |
| 3,973,588 | 8/1976 | Holst | 251/82 |
| 4,142,549 | 3/1979 | Autry | 137/469 |
| 4,750,851 | 6/1988 | Thomey | 411/360 |
| 4,915,560 | 4/1990 | Peterson et al. | 411/386 |
| 5,291,811 | 3/1994 | Goss | 411/404 |
| 5,398,744 | 3/1995 | Street et al. | 137/230 |

*Primary Examiner*—Henry C. Yuen
*Assistant Examiner*—Joanne Y. Kim
*Attorney, Agent, or Firm*—John M. Vasuta

[57] ABSTRACT

An improved capping mechanism which self-aligns as it is tightened irregardless of alignment at the initiation of capping. The capping mechanism being for use with any valve such a pressure relief valve with an outlet including radial vents. The valve body having a plurality of truncated threads about its periphery in between the vents. These truncated threads work in unison with internal threads on the cap.

20 Claims, 6 Drawing Sheets

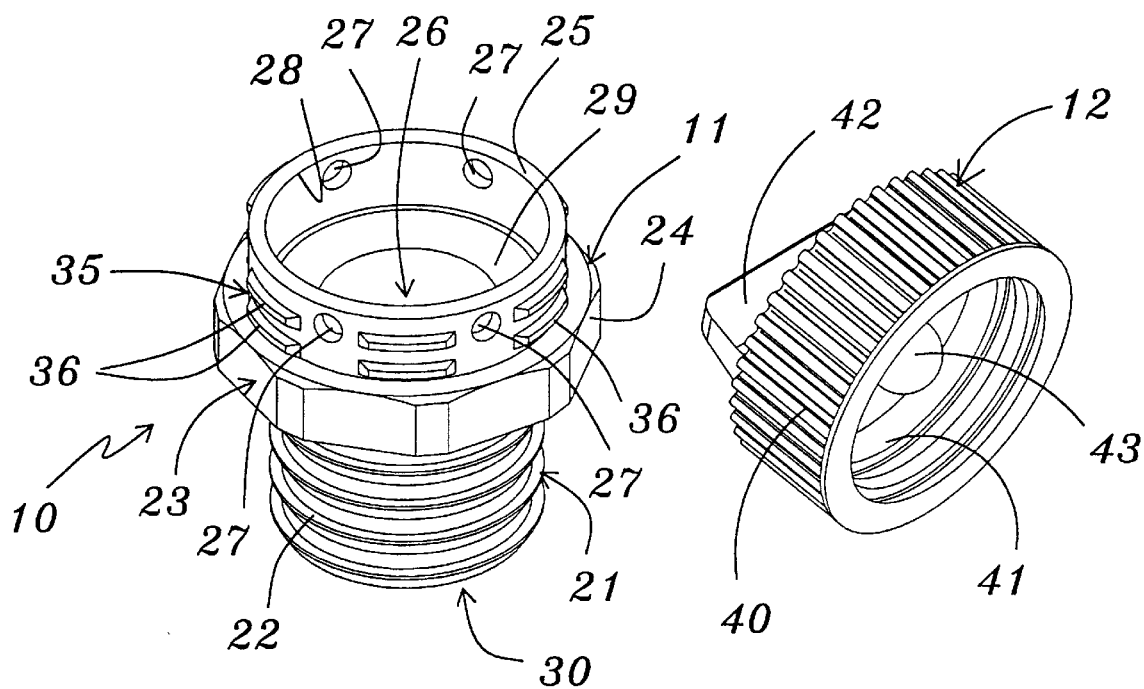
FIG.-7
FIG.-8
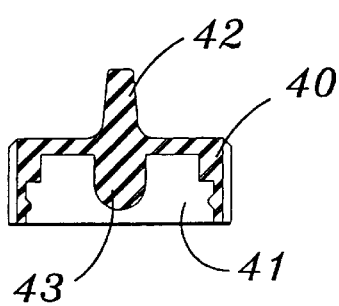
FIG.-9
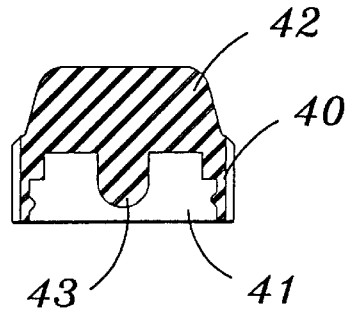
FIG.-10

SELF ALIGNABLE THREADED CAP AND THREADED PRESSURE RELIEF VALVE

BACKGROUND OF THE INVENTION

1. Technical Field

The invention relates to a male and female thread combination on a capping mechanism and a valve such as a pressure relief valve as used on life rafts, escape slides, white water rafts, kayaks, etc. where the male and female threads assure alignment of the cap on the valve when fully tightened down. More particularly, the invention relates to a self aligning male and female thread combination where the capping mechanism when threaded upon the valve such as a pressure relief valve always aligns before the cap is completely threadably tightened irregardless of whether the cap was properly aligned when the threading process began. Specifically, the invention is a valve such as a pressure relief valve and cap where slightly angled annular ridges, which are located between each of the exhaust ports in the valve in a spiral or thread-like manner, interact with an internal thread in the cap so as to align a misaligned cap by continuing to tighten the cap on the annular ridges.

2. Background Information

For years, valves such as pressure relief valves have been used in conjunction with various types of inflatable devices including life rafts, escape slides, etc. Other valves include inlet check valves, topping or inflate/deflate valves, and transfer valves. Generally, each of these valve types involves a valve body with only a few access ports. One access port fluidly connects the valve to within the inflatable device and is thus not subject to leakage. However, at least one port fluidly connects the valve to the environment, the area outside of the inflation device and thus its seal is critical to preventing leakage. As a result, it may be important in certain circumstances that it is protected from damage, debris blockage, etc.

Although damage in a few cases can be an issue, temporary internal pressure spikes are the main concern as to raft deflation and thus the main reason capping would be desirable. Such spikes are often a result of waves encountering the flexible raft and momentarily compressing the air therein resulting in a pressure spike that may open the pressure relief valve thereby incrementally deflating the raft. As waves are continuous, this intermittent process may eventually deflate the raft. This is accentuated in rough seas.

One example where it has been found that such incremental pressure spiking and pressure relieving is very frequent is the area of inflatable assault boats. These inflatable assault boats must be rapidly inflated, thereafter remain inflated, and must be capable of high speed boating. It has been found that during such high speed boating, the waves and rough seas provide sufficient forces against the raft causing momentary pressure increases or spikes resulting from the turbulent and powerful waves and rough seas whereby the raft eventually deflates at least partially. The intermittent forcing open of the valves due to water pressure from the powerful waves is thus undesirable as deflation occurs. For these reasons, it would be highly desirable that after inflation of an assault boat, the pressure relief valves are capped.

Obviously, in the case of life rafts, waves also present similar problems although often not quite as grave due to the lack of high speed movement of life rafts versus assault boats. However, rough seas will often simulate the high speed conditions.

Another problem that may be encountered is the entry of debris into the valve. It is possible that such debris can become lodged in the valve and particularly at the poppet or other seal seat. As a result of debris across the seal, sealing may not occur resulting in slow leakage.

Finally, in very rare instances, a valve may not fully seal and as such capping would eliminate the concern surrounding such rare leaks.

It is critical that leaks be eliminated because even a slow leak over time may result in significant deflation of the inflatable device. Such deflation may be hazardous, particularly in the case of a life raft.

It is thus desirous to cap the entire valve assembly or at least the portion containing any access ports such that high seas and rough waves cannot temporarily spike the pressure within the inflatable device thereby forcing the valve open; this is accomplished by the present invention which caps the valve and holds the poppet closed. It is also desirous to prohibit debris from coming into contact with the valve (as damage or seal interference may result, either of which can cause leaking). This capping is not always an easy process as the valve may be in a peculiar, difficult to reach and/or see place. In addition, the inflation device may not be still during capping such as where a life raft is on the open, and possibly rough, sea. As a result, often the cap is either impossible to install, or very difficult to install. One such problem often encountered is that the threading of the cap is started but in a crooked, misaligned or cross-threaded manner. This requires removal of the cap followed by re-starting of the threading process which as stated above may be a difficult process due to the placement of the valve, and/or the rough seas.

Clearly, an improved capping mechanism is desirous. In addition to the desire to cap a leaky valve such as a pressure relief valve, it is sometimes necessary to disable the relief or other mechanisms of certain valves during certain operations, such as testing, involving the inflatable device. For example, leak testing and periodic service procedures on inflatable devices such as life rafts require either the disablement or removal and plugging of all pressure relief valves present in the inflation device because the raft must be over pressured. In the past, the pressure relief valve has been removed and a plug inserted in its place. Clearly, an easy-to-use cap for capping the pressure relief valve or other valve would be desirable where such capping would either or both cover the internal components of the valve and any exhaust ports, and/or force the valve into a closed seating position, that is depress the poppet or similar sealing mechanism.

SUMMARY OF THE INVENTION

Objectives of the present invention include providing a capping mechanism for valves such as pressure relief valves as used in conjunction with inflatable devices so as to prevent or stop leaks.

A further objective of the present invention is providing a capping mechanism for valves, such as pressure relief valves as used in conjunction with inflatable devices, that forces the valve closed when fully capped.

A further objective of the present invention is providing a capping mechanism for valves, such as pressure relief valves as used in conjunction with inflatable devices, that covers all of the external ports in the valve.

A further objective of the present invention is providing a capping mechanism for valves such as pressure relief valves, as used in conjunction with inflatable devices, so as to allow easier and more efficient servicing of the inflatable device.

A further objective of the present invention is providing the ability to disable a valve in the inflation device for over pressuring the device without removing the valve.

A further objective of the present invention is providing an improved valve body for receiving a capping mechanism.

A further objective of the present invention is providing a valve body having a unique thread design for self aligning a cap during tightening irregardless of alignment at the initiation of the threading.

A further objective of the present invention is providing a valve body with such a unique thread design that does not affect the required exhaust ports in a pressure relief valve with radial exhaust vents or ports.

A further objective of the present invention is providing a capping mechanism which assist in self aligning during the tightening of the capping mechanism onto a valve body irregardless of alignment of the cap and valve body at initiation of threading.

A further objective of the present invention is providing a valve and cap having all of the above objectives and advantages.

These objectives and advantages are obtained by the self aligning male and female thread combination on a capping mechanism and valve used on inflatable devices of the present invention, the general nature of which may be stated as is found in the claims.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 7 is a perspective view of the preferred embodiment of a valve body of the present invention;

FIG. 8 is a perspective view of the preferred embodiment of a cap of the present invention;

FIG. 9 is a cross sectional view of the cap of FIG. 8 cut through its center and taken perpendicular to the axis of the handle;

FIG. 10 is a cross sectional view of the cap of FIGS. 8–9 cut through its center but taken along the axis of the handle;

Similar numerals refer to similar parts throughout the drawings.

DESCRIPTION OF THE PREFERRED EMBODIMENT

Figure 1:
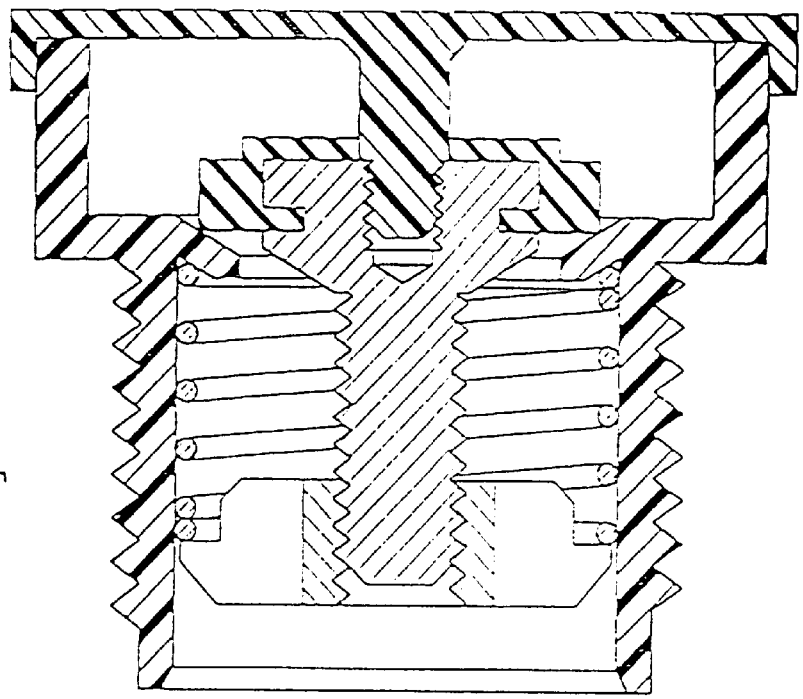
FIG. 1 is a sectional view of a first prior art pressure relief valve shown when maximum pressurization has not been achieved.

The self aligning male and female thread combination on a capping mechanism and valve used on inflatable devices of the present invention for use in inflation devices such as life rafts, escape slides, white water rafts, kayaks, and the like is indicated generally at 10 in the Figures. This male and female thread combination 10 includes a valve body 11 and a cap 12.

One configuration of valve body 11 is shown and described herein, however valve body 11 may be any type, configuration, construction, shape, size, or design of valve body so long as it includes at least one outlet port or exhaust area that may need capped or otherwise covered during or after use to prevent poppet actuation due to intermittent and temporary pressure spikes, or to seal off a leak or potential leak, or to be sealable during vlave testing. Again, one such example is shown in FIG. 7 as one type of a pressure relief valve body 11. This body 11 includes a neck region 21 having external threads 22 thereon, and a head region 23 including a flange 24 and exhaust region 25. A fluid passage 26 extends axially through the body 11 from end to end. In more detail, the exhaust region 25 is a cylindrical sleeve with a plurality of radial vents 27 therein and an open end 28 extending inward to a shoulder 29. Shoulder 29 reduces the diameter of the fluid passage which extends to the other open end 30 which is inserted within the inflation device in use.

The plurality of vents 27 are typically equidistant apart in a radial manner around the exhaust region 25. In use, a poppet or piston assembly is biased within the fluid passage against shoulder 29 such that only excess pressure greater than the spring bias causes movement of the poppet. This poppet movement is such that the poppet, which is generally the same diameter as open end 28, is lifted away from shoulder 29 until a fluid path is defined from other open end 30 to vents 27.

In accordance with one of the features of the invention, a plurality of truncated threads 35 are positioned in between the vents. These threads as described below in more detail allow a cap to be threaded over the valve.

This pressure relief valve is generally only used either during inflation of the inflatable device when over pressure occurs or on deployed (inflated) inflatable devices as the internal pressure cycles from cool night temperatures to warm or hot day temperatures (particularly where direct sunlight is present) thereby causing over pressure. In either case, the pressure relief valve is necessary since overinflation would cause damage to the inflation device. These pressure relief valves, often referred to as PRVs, basically assure that a certain predetermined maximum internal pressure within the inflatable device is not surpassed. If the internal pressure exceeds this maximum, the PRV opens thereby exhausting the surplus pressure and returning the inflation device to a "safe" pressure. This assures that the inflation device is never over inflated.

Figure 2:
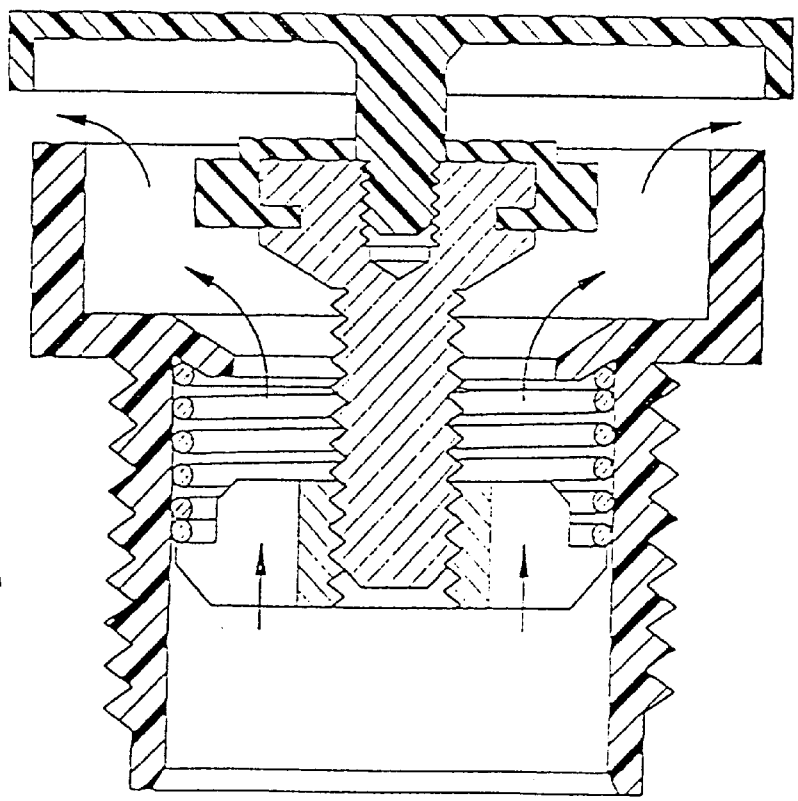
FIG. 2 is the same sectional view as in FIG. 1 except maximum pressurization has been achieved.
Figure 3:
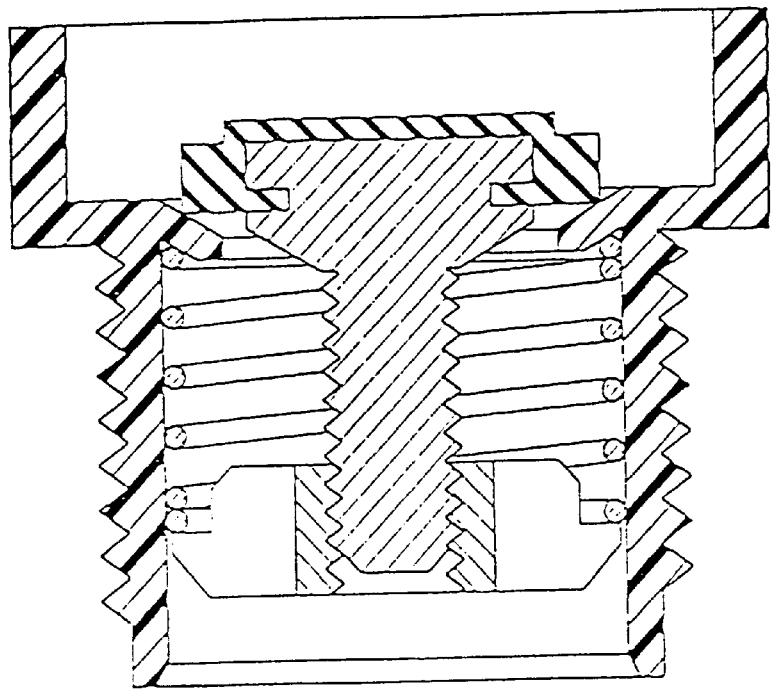
FIG. 3 is a sectional view of a second prior art pressure relief valve shown when maximum pressurization has not been achieved.
Figure 4:
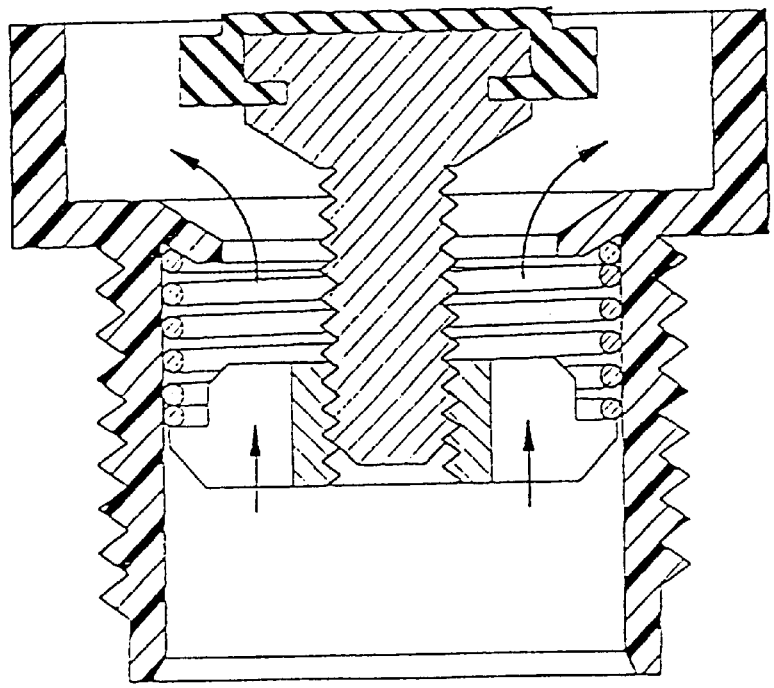
FIG. 4 is the same sectional view as in FIG. 3 except maximum pressurization has been achieved.
Figure 5:
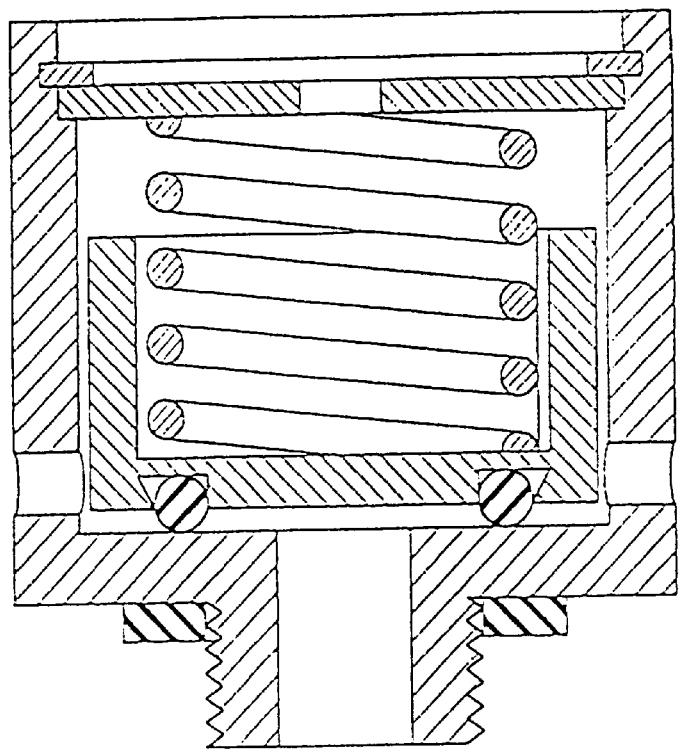
FIG. 5 is a sectional view of a third prior art pressure relief valve shown when maximum pressurization has not been achieved.
Figure 6:
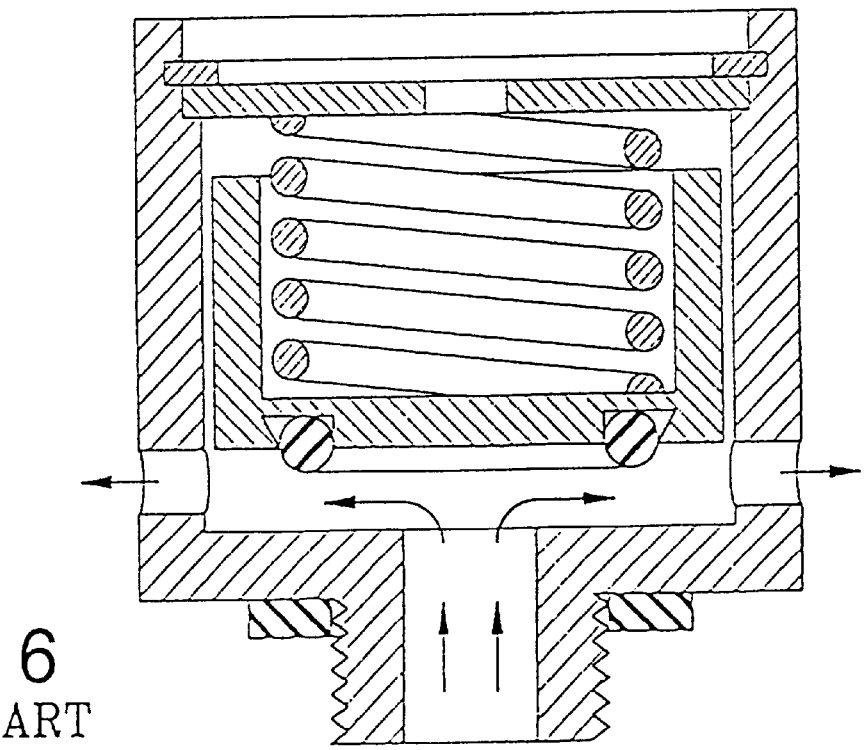
FIG. 6 is the same sectional view as in FIG. 5 except maximum pressurization has been achieved.
Figure 11:
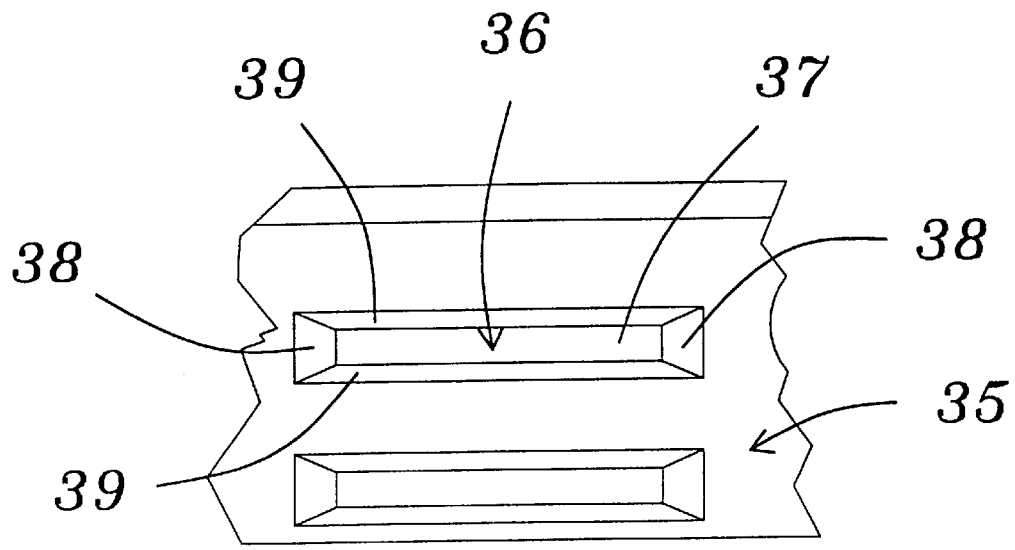
FIG. 11 is a partial enlarged view of the threads.
Figures 12, 13:
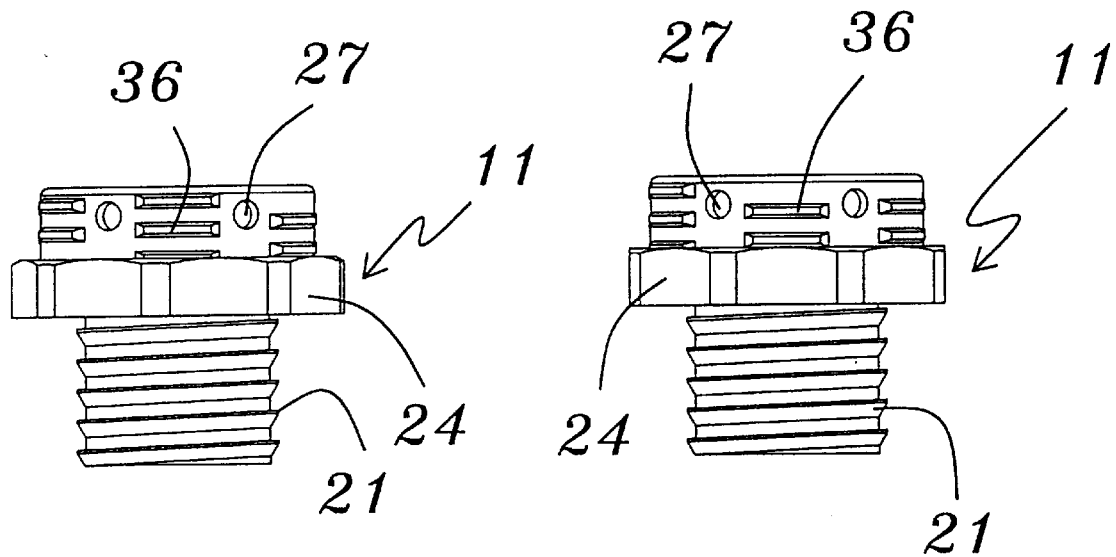
FIG. 12 is a side view of the valve body of FIG. 7 taken at the starting or outermost point of the threads looking at a first port.
FIG. 13 is a side view of the valve body of FIG. 12 taken at a second port adjacent the first port.
Figures 14, 15:
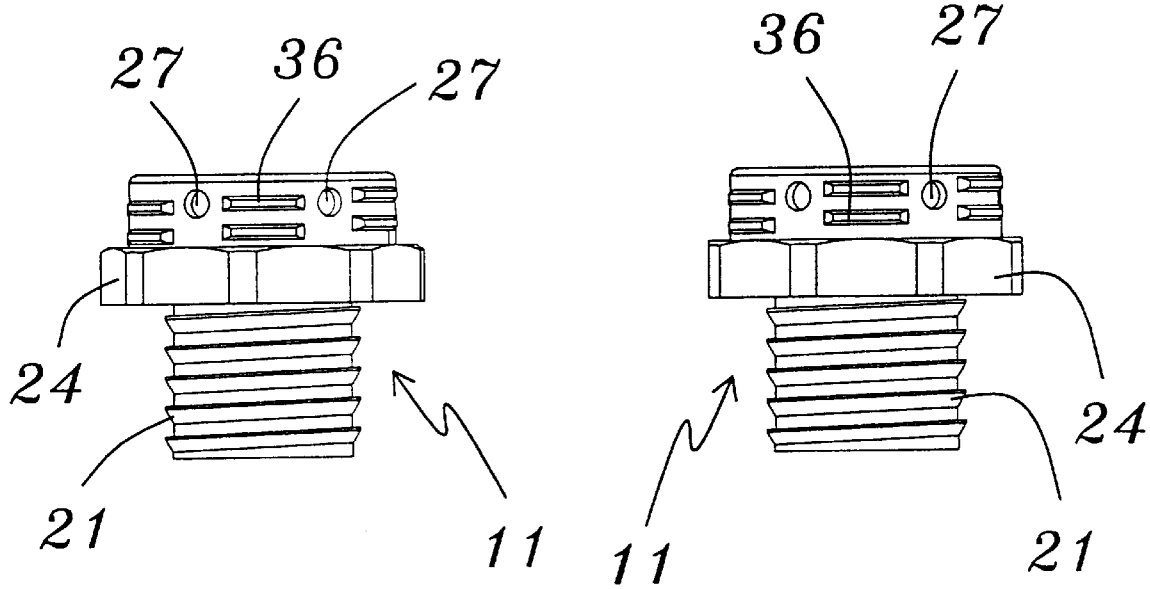
FIG. 14 is a side view of the valve body of FIGS. 12 and 13 taken at a third port adjacent the second port.
FIG. 15 is a side view of the valve body of FIGS. 12–14 taken at a fourth port adjacent the third port.
Figures 16, 17:
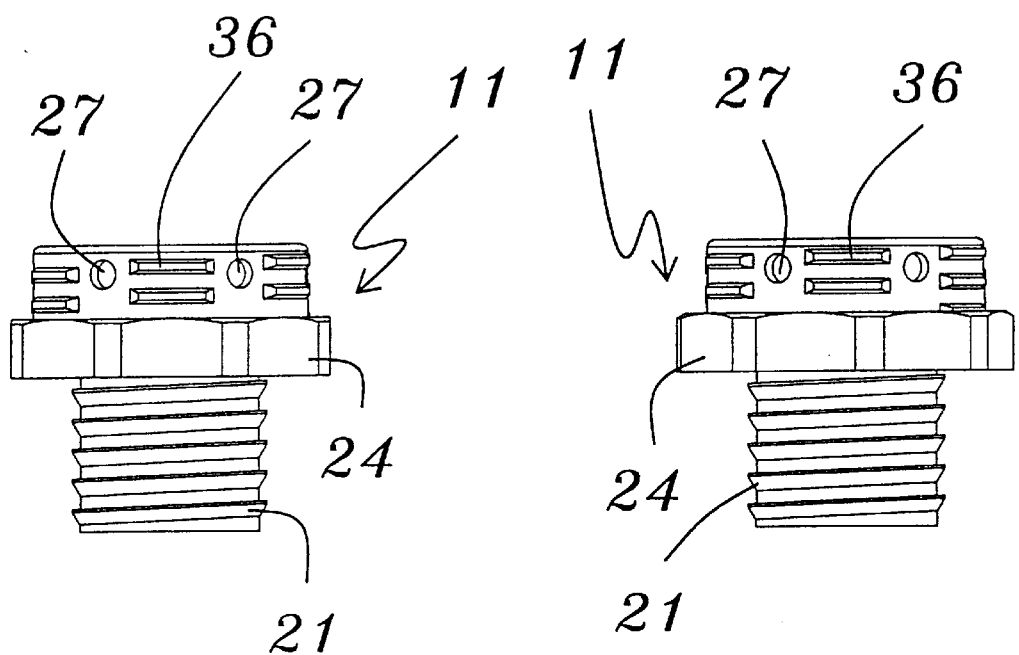
FIG. 16 is a side view of the valve body of FIGS. 12–15 taken at a fifth port adjacent the fourth port.
FIG. 17 is a side view of the valve body of FIGS. 12–16 taken at a sixth port adjacent both the fifth and first ports.

Many types or designs of PRVs are known in the art. These designs include older designs where the poppet did not fill the entire upper throat such that this excess diameter functioned as the exhaust area as shown in prior art FIGS. 1–2 for an unbonneted embodiment and in prior art FIGS. 3–4 for a bonneted embodiment. These designs also include the newer radial exhaust port embodiments such as is shown in U.S. Pat. No. 4,142,549 and prior art FIGS. 5–6, and in U.S. Provisional Patent Application Ser. No. 60/030,727.

After inflation is achieved, the pressure relief valve is generally still needed (where temperature or pressure would significantly change such as from cool evening or night to warm or hot days). Since in some instances it is desirable to cap the valve to prevent leaks, or in the event of a leak, cap the valve to stop a leak, a capping mechanism would be useful. However, it must be an easily removable and reusable cap based upon the above-referenced temperature cycling which sometimes causes a need for exhausting.

As indicated above, often capping is difficult due to the remote location of the valve. in addition, the inflation device may be rocking or otherwise moving whereby such a capping action is somewhat difficult to perform; one such example is a life raft on the open sea while another is an assault boat traveling at high speeds across the water. This remote location and rocking motion may result in the cap being misaligned over the valve.

Therefore, in accordance with one of the features of the invention, the threads 35 are designed such that a misaligned cap may be further threadably forced over the valve whereby the threads cause proper alignment during this forcible further threading. This is critical since it is not only important that the cap seats properly for sealing, but it is further important that the cap seat properly so that it can easily be removed and later reused as the temperature cycles. Should the cap have either cross-threaded or not fully seated, then leaking and possibly an inability to remove may occur both of which may result in raft deflation either by slow leaking or a larger blowout of a seam (if overpressure occurs and the pressure relief valve is unavailable or blocked by the now unremovable cap).

In furtherance of this feature, the threads 35 are designed as shown in FIGS. 7 and 11–16. Each length 36 of thread has a top face 37, a pair of beveled end edges 38 (the leading and trailing edges), and a pair of longitudinal edges 39. Specifically, the threads 35 are angled or slope between vent holes at an angle of approximately 2°. This allows the cap 12 to be screwed on in a standard manner. In addition, each individual length 36 of the thread is rounded or beveled on all of its edges, namely each of its two longitudinal edges 39 as well as each of its two end edges 38. These end edge bevels 38 are sloped between an angle of 30° and 60°, and preferably 45° while the longitudinal edge bevels 39 are sloped between an angle of 28° and 32° and preferably approximately 30° from the top or outermost surface of each length 36. Furthermore, at least two lengths 36 are found in between each adjacent pair of vents 27, although in some areas or embodiments, three or more may be present. The length, width, and height of each length 36, and the distance between adjacent parallel lengths and the distance between sets of lengths across the vent area is not critical so long as the cap 12 with a standard thread therein is threadable thereon and capable of aligning itself when misaligned.

In accordance with the cap features of the invention, cap 12 is a cylindrical body 40 with a sunken cavity 41 in the base thereof having threads therein. The cap may also include a handle or other flange 42 thereon to assist in tightening and removal. The cap preferably also includes a center stop 43 for prohibiting lifting of the poppet in the valve. This stop also forces the poppet to seat against the shoulder thereby reducing or eliminating leaks because an inward force is applied to the top surface of the poppet forcing it into tight engagement with the sealing shoulder.

In use, the cap 12 threads easily onto the valve body 11. However, should the cap be misaligned but still threadably started, the cap 11 may be forcibly tightened whereby the threads in the cap in unison with the truncated threads of the valve body will force alignment to occur as tightening occurs. In effect, the cap will snap into alignment. The result being the covering of the open end 28 and the vents 27 and the forcing of the center stop 43 against the poppet thereby sealing the valve from leaking as the other open end is inserted within the inflation device.

The threads in the cap may be of any thread type that is functional with the truncated threads of the valve body.

The valve as described above has been a pressure relief valve with radial vents. This valve however could be any type of valve as used on inflation device such as valves with only end ports including the topping valve.

Accordingly, the improved male and female thread with realigning ability is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the invention is constructed and used, the characteristics of the construction, and the advantageous, new and useful results obtained; the new and useful structures, devices, elements, arrangements, parts and combinations, are set forth in the appended claims.

We claim:

1. A pair of self-aligning male and female threadably matable parts comprising:

a valve having a neck and a head, the neck being insertable within an inflation device and providing a fluid passage in fluid communication with the inflatable device and extending to at least one exhaust port in the head, and the head including truncated annular threads about a peripheral surface thereon; and a cap having a threaded recess whereby the threaded recess in combination with the truncated annular threads provides self-alignment of the cap during twistable tightening even where threading was not begun under proper alignment of the truncated annular threads with the threaded recess.

2. The pair of self-aligning male and female threadably matable parts of claim 1 wherein the cap properly threads onto the head even where initially cross-threading occurred between the truncated annular threads and the threaded recess.

3. The pair of self-aligning male and female threadably matable parts of claim 1 wherein the truncated threads helically wind around the peripheral surface.

4. The pair of self-aligning male and female threadably matable parts of claim 3 wherein the truncated threads that helically wind around the peripheral surface includes a plurality of thread sections helically aligned end to end so as to cumulatively define the truncated threads.

5. The pair of self-aligning male and female threadably matable parts of claim 4 wherein adjacent end to end aligned thread sections are separated by a gap.

6. The pair of self-aligning male and female threadably matable parts of claim 5 wherein each thread section has a pair of opposing longitudinal edges separated by a pair of opposing end edges all of which extend out to a top face, where all of the edges taper inward toward the opposing edge at each extends outward from the peripheral surface.

7. The pair of self-aligning male and female threadably matable parts of claim 6 wherein the taper of the longitudinal edges is between 28° and 32°.

8. The pair of self-aligning male and female threadably matable parts of claim 7 wherein the taper of the end edges is between 30° and 60°.

9. The pair of self-aligning male and female threadably matable parts of claim 8 wherein the helical angle of the thread sections is approximately 2°, the taper of the longitudinal edges is 30°, and the taper of the end edges is 45°.

10. The pair of self-aligning male and female threadably matable parts of claim 1 wherein the valve includes a poppet and the cap includes a stop within the recess that depresses the poppet into sealed engagement of the fluid passage when the cap is fully threaded onto the head.

11. A self-aligning pair of threads comprising:
    a cap having a recess therein with a first surface having female threads thereon; and
    a second surface including truncated annular male threads thereon whereby the threaded recess in combination with the truncated annular threads provides self-alignment of the cap during twistable tightening even where threading was not begun under proper alignment of the truncated annular threads with the threaded recess.

12. The self-aligning pair of threads of claim 11 wherein the truncated threads helically wind around the second surface and include a plurality of thread sections helically aligned end to end so as to cumulatively define the truncated threads.

13. The self-aligning pair of threads of claim 12 wherein each thread section has a pair of opposing longitudinal edges separated by a pair of opposing end edges all of which extend out to a top face, where all of the edges taper inward toward the opposing edge at each extends outward from the peripheral surface.

14. The self-aligning pair of threads of claim 13 wherein the taper of the longitudinal edges is between 28° and 32°, and the taper of the end edges is between 30° and 60°.

15. The self-aligning pair of threads of claim 14 wherein the helical angle of the thread sections is approximately 20, the taper of the longitudinal edges is 30°, and the taper of the end edges is 45°.

16. A pressure relief valve comprising:
    a valve having a neck and a head that define a shoulder within a fluid passage, the fluid passage extending within the valve from a first port in the neck to a second port in the head with the shoulder therebetween, the neck being insertable within an inflation device such that the first end is in fluid communication with the inflatable device while the second end being in fluid communication with the environment, the head further including a plurality of radial vents with truncated annular threads therebetween about a peripheral surface on the head; and
    a cap having a threaded recess whereby the threaded recess in combination with the truncated annular threads provides self-alignment of the cap during twistable tightening even where threading was not begun under proper alignment of the truncated annular threads with the threaded recess.

17. The pressure relief valve of claim 16 wherein the truncated threads helically wind around the peripheral surface and include a plurality of thread sections helically aligned end to end so as to cumulatively define the truncated threads.

18. The self-aligning pair of threads of claim 17 wherein each thread section has a pair of opposing longitudinal edges separated by a pair of opposing end edges all of which extend out to a top face, where all of the edges taper inward toward the opposing edge at each extends outward from the peripheral surface.

19. The self-aligning pair of threads of claim 18 wherein the taper of the longitudinal edges is between 28° and 32°, and the taper of the end edges is between 30° and 60°.

20. The self-aligning pair of threads of claim 19 wherein the helical angle of the thread sections is approximately 2°, the taper of the longitudinal edges is 30°, and the taper of the end edges is 45°.

\* \* \* \* \*